United States Patent [19]

Rudolf et al.

[11] 4,259,368

[45] Mar. 31, 1981

[54] MANUFACTURE OF ACICULAR MAGNETIC IRON OXIDE

[75] Inventors: Peter Rudolf, Neuhofen; Werner Steck, Mutterstadt; Wilhelm Sarnecki, Limburgerhof; Christof Jaeckh, Heidelberg, all of Fed. Rep. of Germany

[73] Assignee: BASF Aktiengesellschaft, Fed. Rep. of Germany

[21] Appl. No.: 138,307

[22] Filed: Apr. 8, 1980

[30] Foreign Application Priority Data

Apr. 23, 1979 [DE] Fed. Rep. of Germany ....... 2916403

[51] Int. Cl.³ ..................... C01G 49/06; C01G 49/08
[52] U.S. Cl. .................. 427/130; 252/62.56; 252/62.62; 427/127; 427/128
[58] Field of Search .................. 252/62.56, 62.62; 427/127, 128, 130, 215

[56] References Cited

U.S. PATENT DOCUMENTS

| | | | |
|---|---|---|---|
| 3,903,004 | 9/1975 | Matsumoto et al. | 252/62.56 X |
| 4,082,905 | 4/1978 | Stephan | 252/62.62 X |
| 4,122,216 | 10/1978 | Okazoe | 252/62.62 X |
| 4,188,302 | 2/1980 | Becker et al. | 252/62.56 |

FOREIGN PATENT DOCUMENTS

| | | | |
|---|---|---|---|
| 2905037 | 8/1979 | Fed. Rep. of Germany | 252/62.56 |
| 50-37667 | 4/1975 | Japan | 252/62.56 |
| 50-78599 | 6/1975 | Japan . | |
| 51-38098 | 3/1976 | Japan . | |
| 1436135 | 5/1976 | United Kingdom . | |
| 1458623 | 12/1976 | United Kingdom . | |

*Primary Examiner*—Jack Cooper
*Attorney, Agent, or Firm*—Keil & Witherspoon

[57] ABSTRACT

A process for the manufacture of acicular magnetic iron oxides which consist of a core of gamma-iron(III) oxide and a shell of a magnetite modified with zinc(II) ions and/or manganese(II) ions and which contain, based on the total modified gamma-iron(III) oxide, from 0.1 to 20 percent by weight of iron(II) ions, from 0.1 to 10 percent by weight of zinc(II) ions and/or from 0.1 to 10 percent by weight of manganese(II) ions.

4 Claims, No Drawings

MANUFACTURE OF ACICULAR MAGNETIC IRON OXIDE

The present invention relates to a process for the manufacture of acicular magnetic iron oxide having a higher coercive force than that of the starting material.

Acicular gamma-iron(III) oxide has been employed for a long time and on a large scale as a magnetizable material in the manufacture of magnetic recording media. However, as a result of continued development in the field of recording technology, there is an increasing need for magnetic materials which in particular have a higher coercive force than gamma-iron(III) oxide. It is true that the coercive force of iron oxides can, under certain circumstances, be substantially increased by modification with cobalt, but such modified materials show a number of undesirable properties, in particular the residual induction and coercive force thereof are unstable to thermal and mechanical factors. Materials having these disadvantages are unsuitable for use in magnetic recording media.

An objective which has has long been sought after has therefore been to obtain appropriate materials having a high coercive force, but without the above disadvantages. Thus, U.S. Pat. No. 3,903,004 discloses that the temperature-dependence of the magnetic properties of cobalt-modified gamma-iron(III) oxide can be reduced by a process wherein, simultaneously with the cobalt hydroxide, a hydroxide of one of the metals Cu, Li, Pb, Sn, Ba, Cd, Sr or In is precipitated onto the goethite, after which the material is further processed in a conventional manner. German Laid-Open Application DOS No. 2,507,420 discloses the application of oxides or phosphates of zinc, aluminum, cerium, chromium and others onto cobalt-containing iron oxide hydroxides. A similar procedure is followed in German Laid-Open Application DOS No. 2,343,701. There, cobalt compounds and zinc compounds are co-precipitated onto iron oxide, whilst according to German Laid-Open Application DOS No. 2,325,925 the cobalt-containing iron oxide hydroxide is precipitated from a solution containing zinc ions. This modification of iron oxides modified with cobalt throughout the crystal lattice is merely aimed at reducing the stability problems resulting from the cobalt content.

Another method of achieving an increase in the coercive force of iron oxides, even in the absence of cobalt, is to add zinc ions at the start of, or during, the synthesis of iron oxide hydroxide (German Published Application DAS No. 1,204,644). The addition of zinc influences the habit of the acicular iron oxide hydroxide crystals. However, the longer crystals thus obtained, when converted into gamma-iron(III) oxide, give a product which is insufficiently stable to mechanical stresses to enable it to be incorporated into the binder system for magnetic recording media.

It is an object of the present invention to provide modified acicular magnetic iron oxides which, without modification with cobalt, and without the disadvantages associated therewith, exhibit a higher coercive force than the starting material and nevertheless retain the initial properties of the starting material in respect of, in particular, mechanical stability and dispersibility.

We have found that this object is achieved and that acicular magnetic iron oxides possess the requisite properties if they consist of a core of gamma-iron(III) oxide surrounded by a shell of a magnetite modified with with zinc(II) ions and/or manganese(II) ions and if they contain, based on total modified gamma-iron(III) oxide, from 0.1 to 20 percent by weight of iron(II) ions and from 0.1 to 10 percent by weight of zinc(II) ions and/or from 0.1 to 10 percent by weight of manganese(II) ions, and if they have been prepared by a method wherein acicular gamma-iron(III) oxide is suspended in water, iron(II) ions and zinc(II) ions and/or manganese(II) ions, added to this suspension, are precipitated as hydroxides under an inert gas atmosphere by means of an aqueous base at from 8° to 100° C., and all the solids are filtered off, washed neutral with water and heat-treated for from ½ to 10 hours at below 280° C.

Suitable starting materials for this novel process are the acicular magnetic gamma-iron(III) oxides produced by conventional methods and having a mean particle length of from 0.2 to 1.5 $\mu$m and a length/width ratio of from 6:1 to 20:1. Mechanically stable oxides possessing good dispersibility in organic binder systems are preferred. These gamma-iron(III) oxide particles are obtained by converting acicular iron(III) oxide hydroxide to magnetite in a reducing atmosphere and then oxidizing the magnetite to gamma-iron(III) oxide at below 400° C. Where appropriate, a heat treatment may be carried out before or after reduction in order to improve the mechanical and magnetic properties. It is also possible to treat the various iron oxide intermediates in the production of the gamma-iron(III) oxide with inorganic or organic substances, for example to retain the shape of the particles, and such a treatment may in special cases prove advantageous. A suitable gamma-iron(III) oxide can also be produced by coating an acicular non-magnetic iron oxide or iron oxide hydroxide with a higher hydrocarbon, higher alcohol, amine, fatty acid or fatty acid salt, and converting the oxide to gamma-iron(III) oxide at about 400°–650° C. in the presence of air. The iron(II), zinc(II) and/or manganese(II) compounds required for the novel process must be selected so that in aqueous alkaline solution they form the corresponding hydroxides and do not have an oxidizing action. Advantageously, the chlorides and sulfates are employed in each case.

To carry out the process, the gamma-iron(III) oxide is suspended in water by vigorous stirring or by means of other conventional equipment. A ratio of from 3 to 10 parts by weight of water per part by weight of oxide has proved advantageous. The requisite amount of zinc salt and/or manganese salt may be dissolved in the water employed to prepare the suspension, but may also, without disadvantage, be added to the finished suspension; when two salts are used, they may be added to the suspension in any desired sequence. Subsequently, the zinc hydroxide and/or manganese hydroxide are or is precipitated onto the acicular iron oxide particles at from 8° to 100° C., preferably from 20° to 65° C., by adding an aqueous base, usually 48 percent strength sodium hydroxide solution. This aqueous base must be added in an amount such that after the subsequent dropwise addition of an aqueous iron(II) salt solution, in general an iron(II) chloride solution, the pH of the suspension is greater than 10 and preferably greater than 12. The entire reaction is carried out under an inert gas blanket. Before filtering off and washing all the solids, the mixture is stirred vigorously for from 2 to 6 hours. Finally, the filter cake is dried and heated for from ½ to 10 hours at below 280° C. If the heat treatment is carried out under an inert gas, it has proved advantageous to work at from 100° to 280° C., preferably from 150° to 250° C., whilst if the heat treatment is carried out in air, temperatures of from 110° to 150° C. are advantageous. However, this process step can also be carried out by heating the filter cake first in a stream of air and then under an inert gas, in each case at the temperatures stated above.

Using this process, the novel acicular magnetic iron oxides can be produced from gamma-iron(III) oxide. They are distinguished in particular by coercive forces which, according to the prior art, can only be achieved by modifying the iron oxides with cobalt. Furthermore, it is possible, using the novel process, to retain the advantageous properties of the gamma-iron(III) oxide employed. Accordingly, the coercive force of starting materials already distinguished by high mechanical stability, a narrow particle size distribution and good magnetic orientability can be substantially improved.

The novel acicular magnetic iron oxides are particularly suitable for use in the manufacture of magnetic recording media, all the electro-acoustic parameters influenced by the coercive force being improved accordingly. Such recording media are produced by conventional methods. The magnetic material is dispersed in a polymeric binder; suitable binders are compounds known for this purpose, such as homopolymers and copolymers of vinyl derivatives, polyurethanes, polyesters and the like. The binders are used as solutions in suitable organic solvents which may or may not contain other additives. The magnetic coatings are applied to rigid or flexible bases, e.g. disks, films and cards.

The Examples which follow illustrate the invention.

The magnetic properties of the materials were measured on a vibrating sample magnetometer at a field strength of 160 or 800 kA/m. The coercive force $H_c$, measured in kA/m, was determined on the basis of a tap density of $\rho=1.2$ mg/mm$^3$ ($H_{c(\rho=1.2)}$). The specific remanence $M_{r/\rho}$ and the specific saturation magnetization $M_{m/\rho}$ are each quoted in nTm$^3$/g, the latter property also being measured at a field strength of 800 kA/m as $M_{s/\rho}$ in nTm$^3$/g.

EXAMPLE A 1

1,000 g of an acicular $\gamma$-Fe$_2$O$_3$ having a mean length/width ratio of 10.5:1, a mean particle length of 0.5 μm and a coercive force of 23.5 kA/m are suspended in 3 l of water in which 20.84 g of ZnCl$_2$, i.e. 1% of Zn, based on $\gamma$-Fe$_2$O$_3$ employed, have first been dissolved. 500 ml of 48 percent strength sodium hydroxide solution are then added with vigorous stirring, under a N$_2$ blanket. 70 g of Fe(II) ions, in the form of a technical-grade FeCl$_2$ solution, are then added dropwise over 45 minutes and the mixture is stirred for a further 6 hours at room temperature under a blanket of N$_2$. The solid is then filtered off and washed alkali-free with water. The moist filter cake is finally divided into two parts which are dried and heated in a rotary kiln under the following conditions:

Part A 1/I is dried, and heated, for two hours at 150° C. in a stream of N$_2$.

Part A 1/II is dried, and heated, for two hours at 250° C. in a stream of N$_2$.

The measured magnetic properties, and the titrimetrically determined Fe$_3$O$_4$ content, are shown in Table 1.

EXAMPLE A 2

The procedure described in Example 1 is followed, except that 41.7 g of ZnCl$_2$ (ie. 2% of Zn, based on $\gamma$-Fe$_2$O$_3$) are used. The moist filter cake is dried, and heated, in a stream of nitrogen at 150° C. The results of the measurements are shown in Table 1.

EXAMPLE A 3

The procedure described in Example A 1 is followed, except that 62.5 g of ZnCl$_2$, ie. 3% of Zn, based on $\gamma$-Fe$_2$O$_3$, are employed. The moist filter cake is divided into two parts; part A 3/I is treated at 150° C. for two hours in a stream of nitrogen, whilst part A 3/II is treated at 250° C. for two hours in a stream of nitrogen. The results of the measurements are shown in Table 1.

COMPARATIVE EXPERIMENT B 1

The procedure described in Example A 2 is followed, except that the moist filter cake is treated for two hours at 350° C. in a stream of nitrogen. The results of the measurements are shown in Table 1.

TABLE 1

| Example | Heat treatment | $M_{m/\rho}$ | $M_{r/\rho}$ | *$M_r$/ $M_m$ | $H_c$ $\rho=1.2$ | Fe$_3$O$_4$ % |
|---|---|---|---|---|---|---|
| A 1/I | 150° C./N$_2$, 2h | 85 | 41 | 0.48 | 24.9 | 17.6 |
| A 1/II | 250° C./N$_2$, 2h | 80 | 40 | 0.50 | 25.2 | 21.1 |
| A 2/I | 150° C./N$_2$, 2h | 82 | 40 | 0.49 | 28.6 | 24.0 |
| A 3/I | 150° C./N$_2$, 2h | 79 | 39 | 0.49 | 29.9 | 17.9 |
| A 3/II | 250° C./N$_2$, 2h | 77 | 38 | 0.49 | 28.9 | 22.2 |
| Comparative experiment B 1 | 350° C./N$_2$, 2h | 83 | 40 | 0.48 | 23.1 | 27.6 |

*$M_r/M_m$ = relative remanence

COMPARATIVE EXPERIMENT C 1,000 g of an acicular $\gamma$-Fe$_2$O$_3$, having a mean length/width ratio of 10.4:1, a mean particle length of 0.49 μm and a coercive force $H_c$ of 23 kA/m are suspended in 3 liters of water. 31.4 g of dry zinc chloride, ie. 3% of Zn, based on $\gamma$-Fe$_2$O$_3$ employed, are added and 200 ml of 48 percent strength sodium hydroxide solution are introduced, with vigorous stirring. The suspension is stirred for a further 6 hours, after which it is filtered and the filter residue is washed neutral with water.

The moist filter cake is divided into three parts and these are heat-treated as follows:

Part C/I: 150° C. for two hours in a stream of N$_2$.
Part C/II: 250° C. for two hours in a stream of N$_2$.
Part C/III: 350° C. for two hours in a stream of N$_2$.

The measured magnetic properties are shown in Table 2.

TABLE 3

| Comparative experiment | Heat treatment | $M_{m/\rho}$ | $M_{r/\rho}$ | $M_r/M_m$ | $H_c$ |
|---|---|---|---|---|---|
| C/I | 150° C./N$_2$, 2h | 80 | 37 | 0.46 | 22.3 |
| /II | 250° C./N$_2$, 2h | 80 | 38 | 0.48 | 22.6 |
| /III | 350° C./N$_2$, 2h | 83 | 39 | 0.47 | 22.5 |

EXAMPLE D 1

1,000 g of an acicular $\gamma$-Fe$_2$O$_3$, having a mean length/width ratio of 10.6:1, a mean particle length of 0.5 μm and a coercive force of 23.5 kA/m are suspended in 3 liters of water in which 104.24 g of ZnCl$_2$, ie. 5% of Zn, based on $\gamma$-Fe$_2$O$_3$ employed, have first been dissolved. 500 ml of 48 percent strength sodium hydroxide solution are then added with vigorous stirring, and 60 g of Fe(II) ions, in the form of a technical-grade FeCl$_2$ solution, are added dropwise under a blanket of N$_2$. The batch is then stirred for 7 hours at room temperature, after which it is filtered and the filter residue is washed alkali-free with water. The moist filter cake is divided into four parts. Part D 1/I is treated at 150° C. in a stream of nitrogen for two hours, and part D 1/II at 250° C. in a stream of nitrogen for two hours. In contrast, part D 1/III is treated at 130° C. in a stream of air for two hours.

As a comparative experiment, part D 1/IV is treated at 350° C. in a stream of nitrogen for two hours.

The results of the measurements are shown in Table 3.

EXAMPLE D 2

The procedure described in Example D 1 is followed, except that 100 g of Fe(II) ions, in the form of a technical-grade FeCl$_2$ solution, and 600 ml of 48 percent strength sodium hydroxide solution are used. The moist filter cake is divided into three parts, namely part D 2/I, D 2/II and D 2/III, which are treated like parts D 1/I, D 1/II and D 1/III respectively. The results of the measurements are shown in Table 3.

EXAMPLE D 3

The procedure described in Example D 1 is followed, except that only 50 g of Fe(II) ions, in the form of a technical-grade FeCl$_2$ solution, and 500 ml of 48 percent strength sodium hydroxide solution are added. The moist filter cake is divided into two parts, part D 3/I being treated for two hours in a stream of nitrogen at 150° C. whilst part D 3/II, as a comparative experiment, is treated at 350° C.

The results of the measurements are shown in Table 3.

EXAMPLE D 4

The procedure described in Example D 1 is followed, except that 117 g of Fe(II) ions, in the form of a technical-grade FeCl$_2$ solution, and 600 ml of 48 percent strength sodium hydroxide solution are added.

The moist filter cake is divided into four parts which are heat-treated as follows:

Part D 4/I: 150° C. for two hours in a stream of N$_2$.
Part D 4/II: 180° C. for two hours in a stream of N$_2$.
Part D 4/III: 220° C. for two hours in a stream of N$_2$.
Part D 4/IV: 130° C. for two hours in a stream of air.

The results of the measurements are shown in Table 3.

EXAMPLE E 1

1,000 g of an acicular $\gamma$-Fe$_2$O$_3$ having a mean length/width ratio of 10.6:1, a mean particle length of 0.48 $\mu$m and a coercive force of 23.7 kA/m are suspended in 3 liters of water in which 104.204 g of ZnCl$_2$, ie. 5% of Zn, based on $\gamma$-Fe$_2$O$_3$ employed, have first been dissolved. The suspension is cooled to 10° C. and 500 ml of 48 percent strength sodium hydroxide solution are added in portions. 70 g of Fe(II) ions, in the form of a technical-grade FeCl$_2$ solution, are then introduced dropwise. Thereafter the suspension is stirred for 13 hours and kept at a reaction temperature of 10° C. under a blanket of N$_2$ until the reaction is over. Finally, the solid is filtered off and washed alkali-free. Half of the filter cake, namely part E 1/I, is treated at 100° C. for three hours in a stream of nitrogen, whilst the other half, part E 1/II, is treated at 150° C.

The results of the measurements are shown in Table 4.

EXAMPLE E 2

The procedure described in Example E 1 is followed, except that the reaction temperature is kept at 60° C. The filter cake is divided into three parts which are heat-treated as follows:

Part E 2/I: 150° C. for two hours in a stream of N$_2$.
Part E 2/II: 180° C. for two hours in a stream of N$_2$.
Part E 2/III: 220° C. for two hours in a stream of N$_2$.

The results of the measurements are shown in Table 4.

EXAMPLE F

The procedure described in Example A 1 is followed, except that 8% of Zn, based on $\gamma$-Fe$_2$O$_3$ employed, 140 g of Fe(II) ions, in the form of a technical-grade FeCl$_2$ solution, and 650 ml of 48 percent strength NaOH are added.

The filter cake is divided into four parts which are heat-treated as follows:

Part F/I: 150° C. for two hours in a stream of N$_2$.
Part F/II: 250° C. for two hours in a stream of N$_2$.
Part F/III: 130° C. for two hours in a stream of air.

For comparison, part F/IV is treated at 350° C. for two hours in a stream of N$_2$.

The results of the measurements are shown in Table 4.

TABLE 4

| Example | Heat treatment | $M_{m/\rho}$ | $M_{r/\rho}$ | $M_r/M_m$ | $H_c$ $\rho = 1.2$ | Fe$_3$O$_4$ % |
|---|---|---|---|---|---|---|
| D 1/I | 150° C./N$_2$, 2h | 77 | 38 | 0.49 | 34.5 | 20.8 |
| D 1/II | 250° C./N$_2$, 2h | 76 | 38 | 0.50 | 32.0 | 19.0 |
| D 1/III | 130° C./air, 2h | 72 | 35 | 0.49 | 26.8 | 9.0 |
| Comparative experiment D 1/IV | 350° C./N$_2$, 2h | 84 | 39 | 0.46 | 21.9 | 25.8 |
| D 2/I | 150° C./N$_2$, 2h | 75 | 37 | 0.49 | 34.3 | 23.8 |
| D 2/II | 250° C./N$_2$, 2h | 72 | 36 | 0.50 | 33.6 | 26.3 |
| D 2/III | 130° C./air, 2h | 70 | 34 | 0.49 | 29.7 | 21.1 |
| D 3/I | 150° C./N$_2$, 2h | 77 | 38 | 0.49 | 29.9 | 14.9 |
| Comparative experiment D 3/II | 350° C./N$_2$, 2h | 81 | 39 | 0.48 | 22.6 | 23.5 |
| D 4/I | 150° C./N$_2$, 2h | 80 | 38 | 0.48 | 28.0 | 31.0 |
| D 4/II | 180° C./N$_2$, 2h | 78 | 39 | 0.50 | 28.0 | 30.3 |
| D 4/III | 220° C./N$_2$, 2h | 80 | 39 | 0.49 | 29.5 | 30.9 |
| D 4/IV | 130° C./air, 2h | 82 | 39 | 0.48 | 28.9 | 16.4 |

TABLE 5

| Example | Heat treatment | $M_{m/\rho}$ | $M_{r/\rho}$ | $M_r/M_m$ | $H_c$ $\rho = 1.2$ | $Fe_3O_4$ % |
|---|---|---|---|---|---|---|
| E 1/I | 100° C./N$_2$, 3h | 79 | 38 | 0.48 | 27.9 | 18.2 |
| E 1/II | 150° C./N$_2$, 2h | 78 | 38 | 0.49 | 29.9 | 18.9 |
| E 2/I | 150° C./N$_2$, 2h | 79 | 38 | 0.48 | 30.0 | 20.8 |
| E 2/II | 180° C./N$_2$, 2h | 79 | 39 | 0.49 | 31.6 | 17.8 |
| E 2/III | 220° C./N$_2$, 2h | 82 | 39 | 0.48 | 30.0 | 20.5 |
| F /I | 150° C./N$_2$, 2h | 69 | 33 | 0.48 | 31.4 | 32.9 |
| F /II | 250° C./N$_2$, 2h | 70 | 34 | 0.49 | 29.5 | 25.7 |
| F /III | 130° C./air, 2h | 66 | 32 | 0.48 | 32.2 | 14.3 |
| Comparative experiment | | | | | | |
| F /IV | 350° C./N$_2$, 2h | 77 | 35 | 0.45 | 21.9 | 40.6 |

EXAMPLE G 1

1,000 g of acicular γ-Fe$_2$O$_3$, having a mean length/width ratio of 10.5:1, a mean particle length of 0.5 μm and a coercive force of 23.5 kA/m are suspended in 3 liters of water in which 36 g of MnCl$_2$.4H$_2$O, ie. 1% of Mn, based on Ξ-Fe$_2$O$_3$ employed, have first been dissolved. 500 ml of 48 percent strength sodium hydroxide solution are added, whilst stirring, and 70 g of Fe(II) ions, in the form of a technical-grade FeCl$_2$ solution, are then introduced dropwise at room temperature under a blanket of N$_2$. The batch is stirred for a further 6 hours and is then filtered, and the filter cake is washed alkali-free with water. The moist filter cake is divided into three parts; part G 1/I is treated at 150° C. for two hours in a stream of N$_2$ and part G 1/II at 250° C. for two hours in a stream of N$_2$. For comparison, part G 1/III is treated at 350° C. for two hours in a stream of N$_2$.

The results of the measurements are shown in Table 5.

EXAMPLE G 2

The procedure described in Example G 1 is followed, except that 180.1 g of MnCl$_2$.4H$_2$O and 100 g of Fe(II) ions, in the form of a technical-grade FeCl$_2$ solution, are used. The moist filter cake is divided into parts G 2/I, G 2/II and G 2/III which are treated under the same conditions as G 1/I, G 1/II and G 1/III respectively. The results of the measurements are shown in Table 5.

EXAMPLE H 1

1,000 g of acicular γ-Fe$_2$O$_3$, having a mean length/width ratio of 10.5:1, a mean particle length of 0.5 μm and a coercive force of 23.5 kA/m are suspended in 3 liters of water in which 62.5 g of ZnCl$_2$ and 108 g of MnCl$_2$.4H$_2$O, ie. 3% of Zn and 3% of Mn, based on γ-Fe$_2$O$_3$ employed, have first been dissolved. 650 ml of 48 percent strength sodium hydroxide solution are added, whilst stirring, and 100 g of Fe(II) ions, in the form of a technical-grade FeCl$_2$ solution, are then added dropwise at room temperature under a blanket of inert gas. The suspension is stirred for a further 6 hours, after which it is filtered and the filter residue is washed alkali-free with water.

The moist filter cake is divided into 4 parts; part H 1/I is treated at 150° C. for two hours in a stream of nitrogen, part H 1/II at 250° C. for two hours in a stream of nitrogen and part H 1/III at 130° C. for two hours in a stream of air.

For comparison, part H 1/IV is treated at 350° C. for two hours in a stream of nitrogen.

The results of the measurements are shown in Table 5.

EXAMPLE H 2

The procedure described in Example H 1 is followed, except that 104.24 g of ZnCl$_2$ and 108 g of MnCl$_2$.4H$_2$O, ie. 5% of Zn and 3% of Mn, each based on γ-Fe$_2$O$_3$ employed, and 117 g of Fe(II) ions, in the form of a technical-grade FeCl$_2$ solution, are added. The moist filter cake is divided into parts H 2/I to H 2/IV and these are treated respectively under the conditions indicated for H 1/I to H 1/IV. The results of the measurements are shown in Table 5.

TABLE 6

| Example | Heat treatment | $M_{m/\rho}$ | $M_{r/\rho}$ | $M_r/M_m$ | $H_c$ $\rho = 1.2$ | $Fe_3O_4$ % |
|---|---|---|---|---|---|---|
| G 1/I | 150° C./N$_2$, 2h | 83 | 41 | 0.49 | 26.9 | 22.5 |
| G 1/II | 250° C./N$_2$, 2h | 83 | 42 | 0.51 | 26.9 | 28.1 |
| Comparative experiment | | | | | | |
| G 1/III | 350° C./N$_2$, 2h | 83 | 41 | 0.49 | 23.6 | 33.5 |
| G 2/I | 150° C./N$_2$, 2h | 84 | 43 | 0.51 | 28.0 | 32.1 |
| G 2/II | 250° C./N$_2$, 2h | 81 | 42 | 0.52 | 25.2 | 32.0 |
| Comparative experiment | | | | | | |
| G 2/III | 350° C./N$_2$, 2h | 87 | 43 | 0.49 | 22.4 | 41.4 |
| H 1/I | 150° C./N$_2$, 2h | 80 | 38 | 0.48 | 28.5 | 28.3 |
| H 1/II | 250° C./N$_2$, 2h | 80 | 38 | 0.48 | 26.5 | 22.0 |
| H 1/III | 130° C./air, 2h | 79 | 39 | 0.49 | 27.6 | 10.0 |
| Comparative experiment | | | | | | |
| H 1/IV | 350° C./N$_2$, 2h | 88 | 40 | 0.45 | 20.7 | 29.2 |
| H 2/I | 150° C./N$_2$, 2h | 74 | 36 | 0.49 | 28.8 | 23.8 |
| H 2/II | 250° C./N$_2$, 2h | 77 | 35 | 0.45 | 27.0 | 27.4 |
| H 2/III | 130° C./air, 2h | 72 | 35 | 0.49 | 29.5 | 11.1 |
| Comparative | | | | | | |

TABLE 6-continued

| Example | Heat treatment | $M_{m/\rho}$ | $M_{r/\rho}$ | $M_r/M_m$ | $H_c$ $\rho = 1.2$ | $Fe_3O_4$ % |
|---|---|---|---|---|---|---|
| experiment H 2/IV | 350° C./N₂, 2h | 86 | 38 | 0.44 | 20.0 | 30.6 |

EXAMPLE J/1

900 parts of a material prepared as described in Example D 1/III are mixed and dispersed, in a steel ball mill, with 225 parts of a 20 percent strength solution of a copolymer of 80% of vinyl chloride, 10% of dimethyl maleate and 10% of diethyl maleate in a mixture of equal parts of tetrahydrofuran and dioxane, 808 parts of a 13 percent strength solution of a thermoplastic polyesterurethane, obtained from adipic acid, butane-1,4-diol and 4,4'-diisocyanatodiphenylmethane, in a mixture of equal parts of tetrahydrofuran and dioxane, 54 parts of soybean lecithin, 0.9 part of a commercial silicone oil, 1.8 parts of hydroquinone, 1.8 parts of butyl stearate, 9 parts of isostearic acid and 620 parts of the above solvent mixture. 1.5% of 4,4'-diisocyanatodiphenylmethane are then added to the dispersion, which is filtered and applied in a conventional manner to a 6 μm thick polyethylene terephthalate film, in such a thickness that, after orienting the acicular particles in a magnetic field and then effecting drying, a magnetic coating having the thickness d[μm] shown in Table 6 is obtained.

The magnetic properties of the pigment, such as the coercive force $H_c$[kA/m], residual induction $M_r$[mT], saturation magnetization [mT], relative remanence $M_r/M_s$ and orientation factor RF, i.e. the ratio of the residual induction in the direction of particle orientation to that in the crosswise direction, are measured at a field strength of 800 kA/m and are shown in Table 6, as are the electro-acoustic properties, such as the maximum output level at short wavelengths $A_H$ and the sensitivity at short wavelengths $E_H$, measured substantially in accordance with DIN 45,512, on a magnetic tape, cut from the coated film, against reference tape T 308 S at a recording frequency of 10 kHz.

EXAMPLE J/2

The procedure described in Example J/1 is followed, except that the magnetic material from Example A 3/I is employed. The results of the measurements are shown in Table 6.

EXAMPLE J/3

The procedure described in Example J/1 is followed, except that the magnetic material from Example D 2/III is employed. The results of the measurements are shown in Table 6.

EXAMPLE J/4

The procedure described in Example J/1 is followed, except that the magnetic material from Example D 2/I is employed. The results of the measurements are shown in Table 6.

EXAMPLE J/5

The procedure described in Example J/1 is followed, except that the magnetic material from Example D 1/I is employed. The results of the measurements are shown in Table 6.

EXAMPLE J/6

The procedure described in Example J/1 is followed, except that the magnetic material employed is the starting material used in Example A 1. The results of the measurements are shown in Table 6.

TABLE 7

| Example | $H_c$ | $M_r$ | $M_s$ | $M_r/M_s$ | RF | d | $A_H$ | $E_H$ |
|---|---|---|---|---|---|---|---|---|
| J/1 | 28.5 | 144 | 169 | 0.85 | 3.3 | 5.5 | +1.1 | +1.8 |
| J/2 | 31.1 | 148 | 179 | 0.82 | 2.8 | 5.0 | +3.2 | +2.7 |
| J/3 | 31.6 | 148 | 182 | 0.81 | 2.9 | 4.7 | +3.0 | +2.5 |
| J/4 | 36.5 | 151 | 187 | 0.81 | 2.7 | 4.4 | +5.2 | +3.1 |
| J/5 | 38.9 | 165 | 193 | 0.85 | 3.0 | 4.6 | +5.4 | +3.2 |
| J/6 | 21.8 | 149 | 180 | 0.83 | 2.2 | 5.5 | −0.1 | +0.2 |

EXAMPLE K 8.33 g of $ZnCl_2$ are dissolved in 1,200 ml of water, 200 g of an acicular $\gamma$-$Fe_2O_3$ having a mean length/width ratio of 13.0:1, a mean particle length of 0.55 μm and a coercive force of 24.2 kA/m are stirred into the solution. The suspension is heated to 95° C., with vigorous stirring, and 72 ml of a 32% strength $FeCl_2$ solution, followed by 150 ml of a 48% strength sodium hydroxide solution, are added. The suspension is then kept for four hours at 95° C. under a blanket of $N_2$, after which it is filtered and the filter residue is washed alkali-free and chloride-free with water. The moist filter cake is divided into two parts, part K/1 being treated at 150° C. for two hours in a stream of nitrogen, and part K/2 at 250° C. for 2 hours in a stream of nitrogen.

The results of the measurements are shown in Table 7.

TABLE 8

| Example | Heat treatment | $M_{m/\rho}$ | $M_{r/\rho}$ | $M_r/M_m$ | $H_c$ $\rho = 1.2$ | $Fe_3O_4$ % |
|---|---|---|---|---|---|---|
| K/1 | 150° C./N₂, 2h | 82 | 40 | 0.49 | 27.7 | 19.8 |
| K/2 | 250° C./N₂, 2h | 83 | 38 | 0.46 | 27.7 | 22.1 |

We claim:

1. A process for the manufacture of an acicular magnetic iron oxide which consists of a core of gamma-iron(III) oxide surrounded by a shell of a magnetite modified with zinc(II) ions and/or manganese(II) ions, in which is present, based on total modified gamma-iron(III) oxide, from 0.1 to 20 percent by weight of iron(II) ions and from 0.1 to 10 percent by weight of zinc(II) ions and/or from 0.1 to 10 percent by weight of manganese(II) ions, wherein acicular gamma-iron(III) oxide is suspended in water; iron(II) ions, and zinc(II) ions and/or manganese(II) ions are precipitated as hydroxides onto the acicular gamma-iron(III) oxide by means of an aqueous base under an inert gas atmosphere at from 8° to 100° C., the pH of the suspension after the precipitation being greater than 10 and all the solids are filtered off, washed neutral with water and heat-treated for from ½ to 10 hours in air at from 110° to 150° C. and/or in an inert gas atmosphere at from 100° to 280° C.

2. A process as claimed in claim 1, wherein acicular gamma-iron(III) oxide is suspended in water which contains dissolved zinc(II) ions and/or manganese(II) ions, an aqueous base is added so as to precipitate, at from 8° to 100° C., first the zinc(II) ions and/or manganese(II) ions and then the iron(II) ions, subsequently added under an inert gas atmosphere, as hydroxides onto the gamma-iron(III) oxide, and all the solids are filtered off, washed neutral with water and heat- treated for from ½ to 10 hours at from 100° to 280° C. in an inert gas atmosphere.

3. A process as claimed in claim 1, wherein the solids which have been filtered off and washed neutral with water are dried, and heated, for from ½ to 10 hours in air at from 110° to 150° C.

4. A process as claimed in claim 2, wherein the solids which have been filered off and washed neutral with water are dried, and heated, for from ½ to 10 hours in an inert gas atmosphere at from 150° to 250° C.

* * * * *